United States Patent
Luetzow

(10) Patent No.: US 6,798,195 B2
(45) Date of Patent: *Sep. 28, 2004

(54) MAGNETIC POSITION SENSOR HAVING SHAPED POLE PIECES AT LEAST PARTIALLY FORMED OF A NON-MAGNETIC MATERIAL FOR PRODUCING A MAGNETIC FIELD HAVING VARYING MAGNETIC FLUX DENSITY ALONG AN AXIS

(75) Inventor: Robert H. Luetzow, Lytle Creek, CA (US)

(73) Assignee: Wabash Technologies, Inc., Huntington, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/325,531

(22) Filed: Dec. 19, 2002

(65) Prior Publication Data

US 2003/0122641 A1 Jul. 3, 2003

Related U.S. Application Data

(63) Continuation-in-part of application No. 10/079,369, filed on Feb. 19, 2002, now Pat. No. 6,586,929.
(60) Provisional application No. 60/340,571, filed on Dec. 14, 2001.

(51) Int. Cl.[7] .................................................. G01R 7/14
(52) U.S. Cl. ............................. 324/207.24; 324/207.2; 324/207.21; 324/207.22
(58) Field of Search ....................... 324/207.22, 207.12, 324/207.13, 207.26, 251, 261, 262, 207.2, 207.21, 207.24, 207.25; 338/32 R, 32 H

(56) References Cited

U.S. PATENT DOCUMENTS

| | | | | |
|---|---|---|---|---|
| 3,118,108 A | * | 1/1964 | Zoss et al. | 324/251 |
| 3,777,273 A | * | 12/1973 | Baba et al. | 335/236 |
| 4,570,118 A | * | 2/1986 | Tomczak et al. | 324/207.2 |
| 4,810,965 A | * | 3/1989 | Fujiwara et al. | 324/207.22 |
| 5,313,159 A | * | 5/1994 | Allwine, Jr. | 324/207.2 |
| 5,508,611 A | * | 4/1996 | Schroeder et al. | 324/252 |
| 5,670,876 A | * | 9/1997 | Dilger et al. | 324/207.13 |
| 5,955,881 A | * | 9/1999 | White et al. | 324/207.2 |
| 6,018,241 A | * | 1/2000 | White et al. | 324/207.2 |
| 6,107,793 A | * | 8/2000 | Yokotani et al. | 324/207.21 |
| 6,211,668 B1 | * | 4/2001 | Duesler et al. | 324/207.2 |
| 6,215,299 B1 | * | 4/2001 | Reynolds et al. | 324/207.2 |

* cited by examiner

Primary Examiner—Jay Patidar
(74) Attorney, Agent, or Firm—Woodard, Emhardt, Moriarty, McNett & Henry LLP

(57) ABSTRACT

A magnetic position sensor including a pair of magnets of opposite polarity which are spaced apart to define an air gap extending along an axis, and a pair of shaped pole pieces at least partially disposed within the air gap and positioned adjacent respective ones of the magnets. The pole pieces are formed of a composite material comprising a non-magnetic material and a magnetizable material. The pole pieces cooperate with the magnets to generate a magnetic field that is substantially symmetrical relative to the axis and which has a magnetic flux density that linearly varies along the axis. A magnetic flux sensor is positioned within the magnetic field to sense varying magnitudes of magnetic flux density along the axis through a sensing plane oriented substantially perpendicular to the axis. The magnetic flux sensor generates an output signal uniquely representative of a sensed magnitude of the magnetic flux density.

30 Claims, 6 Drawing Sheets

MAGNETIC POSITION SENSOR HAVING SHAPED POLE PIECES AT LEAST PARTIALLY FORMED OF A NON-MAGNETIC MATERIAL FOR PRODUCING A MAGNETIC FIELD HAVING VARYING MAGNETIC FLUX DENSITY ALONG AN AXIS

CROSS REFERENCE TO RELATED APPLICATIONS

The present application is a continuation-in-part of U.S. patent application Ser. No. 10/079,369, filed Feb. 19, 2002 now U.S. Pat. No. 6,586,929, which claims the benefit of U.S. Provisional Application Serial No. 60/340,571, filed on Dec. 14, 2001, the contents of which are hereby incorporated by reference in their entirety.

FIELD OF THE INVENTION

The present invention generally relates to the field of magnetic sensors for sensing the position of a structure over a predetermined range of movement, and more specifically relates to a magnetic position sensor having shaped poles pieces for improved output linearity.

BACKGROUND OF THE INVENTION

Magnetic position sensors are devices that generate a change in electronic signal output that is proportional to the sensed movement of a mechanical component, such as, for example, a control shaft or rotor in the case of rotational position sensors or a carrier mechanism or linkage in the case of linear position sensors. Preferably, the change in electronic signal is achieved without physical contact between the mechanical component and the magnetic sensing element. In non-contacting magnetic position sensors, one or more magnets are used to provide a magnetic field having a magnetic field strength or flux density that varies as a function of position.

The magnitude of the magnetic flux density is measured by an appropriate sensing device, such as, for example, a Hall-effect element or magneto-resistive element. The magnitude of the magnetic flux density is translated through the sensing device to a voltage or current output signal that is uniquely representative of a specific position of a mechanical component relative to the magnetic field. Preferably, the magnetic position sensor provides a substantially linear relationship between electronic signal output and the position of the mechanical component. In addition to providing a linear relationship, minimizing hysteresis is also a desirable feature in most magnetic sensor applications. While annealing the magnets can reduce magnetic hysteresis, the annealing process can never eliminate magnetic hysteresis entirely.

To generate a magnetic field having a substantially linear profile, those skilled in the art sometimes resort to complicated magnet shapes. For example, U.S. Pat. No. 5,995,881 to White et al. discloses a magnetic circuit that utilizes tapered magnets to provide a magnet field having varying magnetic field strength. However, these types of magnetic circuits commonly suffer from performance and/or manufacturing limitations. For example, providing a magnet circuit having a linearly varying magnetic field strength is difficult to achieve via magnet shaping due to non-uniformity in material composition and the geometric configuration of the magnet. Typically, non-standard magnetic materials must be used to manufacture magnets having irregular shapes and configurations. Moreover, complicated magnet shapes often lead to increased manufacturing costs and package size limitations. Additionally, non-standard magnet compositions also increase manufacturing costs.

Magnetic position sensors may be used in a wide variety of applications. For example, magnetic position sensors are used extensively in the automotive industry to monitor the status of various automotive components. Position sensors that are used in automotive-related applications typically experience virtually constant movement and/or mechanical vibration while the automobile is in operation. To that end, such sensors must be constructed of mechanical and electrical components that are assembled in such a manner as to minimize the effects of misalignment and/or mispositioning to allow the sensor to operate in a sufficiently accurate and precise manner over the sensor's projected lifespan. Moreover, automotive position sensors are typically subjected to relatively harsh thermal environments, and therefore must be designed to withstand extreme temperatures and temperature gradients. Typically, automotive sensors must be able to function properly within a temperature range of –40 degrees Celsius to 160 degrees Celsius. Additionally, automotive position sensors must usually satisfy relatively high performance criteria, particularly with regard to sensor accuracy and repeatability.

Thus, there is a general need in the industry to provide a magnetic position sensor having improved output linearity. The present invention satisfies this need and provides other benefits and advantages in a novel and unobvious manner.

SUMMARY OF THE INVENTION

The present invention is directed to a magnetic position sensor having improved output linearity. While the actual nature of the invention covered herein can only be determined with reference to the claims appended hereto, certain forms of the invention that are characteristic of the preferred embodiments disclosed herein are described briefly as follows. However, it should be understood that other embodiments are also contemplated as falling within the scope of the present invention.

The present invention is directed to a magnetic sensor that is generally comprised of a magnetic circuit and a magnetic flux sensor.

In one form of the invention, the magnetic circuit includes first and second magnets spaced apart to define an air gap extending along an axis, and first and second shaped pole pieces at least partially formed of a non-magnetic material and at least partially disposed within the air gap adjacent respective ones of the first and second magnets to produce a magnetic field having varying magnetic flux density along the axis. The magnetic flux sensor is disposed within the magnetic field and is operable to sense varying magnetic flux density along the axis.

In another form of the invention, the magnetic circuit includes first and second magnets spaced apart to define an air gap extending along an axis, first and second shaped pole pieces at least partially formed of a non-magnetic material and at least partially disposed within the air gap adjacent respective ones of said first and second magnets, and a magnetically permeable bracket extending peripherally about the magnets and the pole pieces and being peripherally interrupted by at least one opening. The magnetic circuit produces a magnetic field having varying magnetic flux density along the axis. The magnetic flux sensor is disposed within the magnetic field and is operable to sense varying magnetic flux density along the axis.

In another form of the invention, the magnetic circuit includes first and second magnets spaced apart to define an air gap extending along an axis, first and second shaped pole pieces at least partially formed of a non-magnetic material and at least partially disposed within the air gap adjacent respective ones of the first and second magnets, with the first and second shaped pole pieces including at least one ramp-shaped portion. The magnetic circuit produces a magnetic field having varying magnetic flux density along the axis. The magnetic flux sensor is disposed within the magnetic field and is operable to sense varying magnetic flux density along the axis.

It is one object of the present invention to provide a magnetic position sensor having improved output linearity.

Further objects, features, advantages, benefits, and aspects of the present invention will become apparent from the drawings and description contained herein.

DESCRIPTION OF THE PREFERRED EMBODIMENTS

Figure 1:
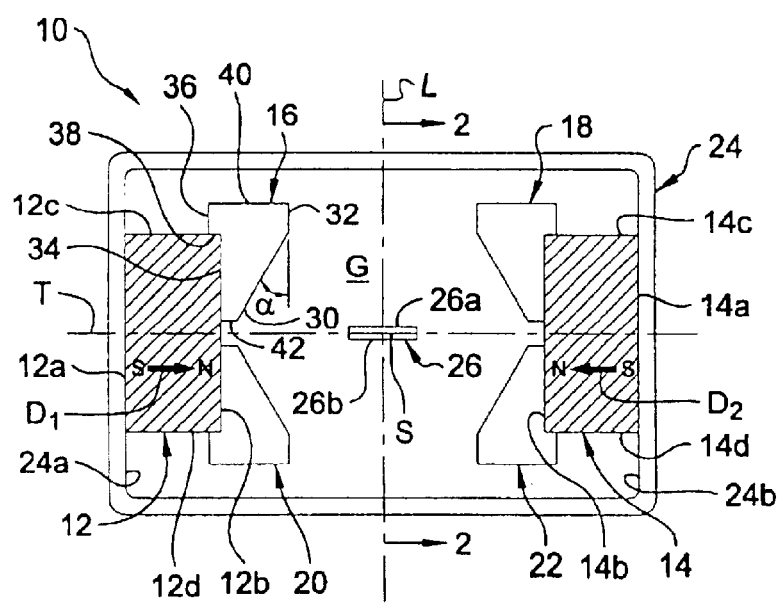
FIG. 1 is a top plan view of a magnetic position sensor according to one form of the present invention.

For the purposes of promoting an understanding of the principles of the present invention, reference will now be made to the preferred embodiments illustrated in the drawings and specific language will be used to describe the same. It will nevertheless be understood that no limitation on the scope of the present invention is intended, with any alterations or modifications in the disclosed embodiments and further applications of the principles of the present invention being contemplated as would normally occur to one skilled in the art to which the present invention relates.

Figure 2:
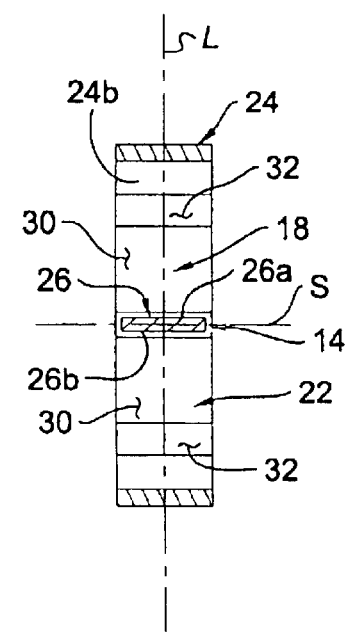
FIG. 2 is a sectional view of the magnetic sensor illustrated in FIG. 1, taken along line 2—2 of FIG. 1.

Referring to FIGS. 1 and 2, shown therein is a magnetic position sensor 10 according to one form of the present invention. The magnetic sensor 10 includes a magnetic circuit that is generally comprised of a pair of opposing magnets 12, 14, a first pair of opposing pole pieces 16, 18, a second pair of opposing pole pieces 20, 22, and a magnetically permeable bracket or enclosure 24. The magnets 12, 14, the pole pieces 16, 18, 20, 22, and the bracket 24 cooperate with one another to generate one or more magnetic fields that have a magnetic flux density which varies in a substantially linear manner along an axis. The magnetic sensor 10 also includes a sensing device 26 that is operable to sense varying magnitudes of the magnetic flux density generated by the magnetic circuit and generates an output signal that is representative of the sensed magnetic flux density.

The magnets 12, 14 are spaced apart to define an air gap G extending along a longitudinal axis L. It should be understood that the air gap G is not necessarily confined to the space directly between the magnets 12, 14, but may also extend beyond the ends of the magnets 12, 14. Moreover, although the longitudinal axis L and the air gap G are illustrated as extending along a substantially linear path, it should be understood that axis L and air gap G may alternatively extend along a non-linear path, such as, for example, an arcuate or circular path.

In a preferred embodiment of the present invention, the magnets 12, 14 are rare earth magnets and have a substantially rectangular configuration. This particular type of magnet is relatively common, thereby increasing sourcing opportunities and reducing the overall cost of the magnetic sensor 10. In a specific embodiment, the rare earth magnets 12, 14 are injection molded and are substantially void of any magnetic flux density "hot spots". However, it should be understood that other magnet compositions and other methods of formation are also contemplated as would occur to one of ordinary skill in the art.

As discussed above, the magnets 12, 14 preferably have a rectangular configuration. Magnet 12 includes a pair of opposite axial surfaces 12a, 12b extending generally along longitudinal axis L and a pair of opposite end surfaces 12c, 12d. In one embodiment, the axial surface 12a is a south pole surface and the axial surface 12b is a north pole surface such that the magnet 12 is polarized in a polarization direction $D_1$. Similarly, magnet 14 includes a pair of opposite axial surfaces 14a, 14b extending generally along longitudinal axis L and a pair of opposite end surfaces 14c, 14d, with the axial surface 14a being a south pole surface and the axial surface 14b being a north pole surface such that magnet 14 is polarized in a polarization direction $D_2$. In one embodiment of the invention, the magnets 12, 14 are arranged within the magnetic circuit such that the polarization direction $D_1$ opposes the polarization direction $D_2$, with the north pole surface 12b of magnet 12 facing the north pole surface 14b of magnet 14.

Although the magnets 12, 14 have been illustrated and described as having a specific shape and polarization configuration, it should also be understood that other shapes and polarization configurations of the magnets 12, 14 are also contemplated as falling within the scope of the present invention. For example, the magnets 12, 14 may take on an arcuate shape or an irregular shape. Moreover, it is also contemplated that the magnets 12, 14 may take on other polarization configurations to provide alternative magnetic circuit set-ups. For example, the polarization directions $D_1$, $D_2$ may be reversed such that the south pole surface 12a of magnet 12 faces the south pole surface 14a of magnet 14, or that only one of the polarization directions $D_1$, $D_2$ is reversed to provide a magnetic field that flows across the air gap G.

The pole pieces 16, 18, 20, 22 are positioned adjacent the magnets 12, 14 and cooperate with the magnets 12, 14 to generate one or more magnetic fields having a magnetic flux density that linearly varies along the longitudinal axis L. For purposes of the present invention, a "pole piece" is broadly defined as any structure that cooperates with a magnet to generate a magnetic field having certain magnetic flux density characteristics.

In a preferred embodiment of present invention, the pole pieces 16, 18, 20, 22 are at least partially formed of a non-magnetic material. Additionally, the pole pieces 16, 18, 20, 22 are preferably formed of a material that has a magnetic reluctance less than the magnetic reluctance of cold rolled steel (CRS). In one embodiment of the invention, the pole pieces 16, 18, 20, 22 are at least partially formed of a plastic or polymer material, such as, for example, a nylon material. However, it should be understood that other suitable non-magnetic materials are also contemplated as falling within the scope of the present invention. In another embodiment of the invention, the pole pieces 16, 18, 20, 22 are formed of a composite material comprised of a non-magnetic material and a magnetizable filler material. In one specific embodiment, the composite material is Nylon 6/6, manufactured by the RTP Company under Part No. RTP 0299 X 85151 B. However, it should be understood that other suitable composite materials are also contemplated as falling within the scope of the present invention. It should also be understood that in certain embodiments of the present invention, the pole pieces 16, 18, 20, 22 are formed of other materials, such as, for example, steel.

In a preferred embodiment of the present invention, the pole pieces 16, 18, 20, 22 have a non-rectangular or irregular shape. In a specific embodiment, the pole pieces 16, 18, 20, 22 have a wedge or ramp shape. As noted above, the pole pieces are preferably at least partially formed of a non-magnetic material such as plastic, and in a specific embodiment are formed of Nylon 6/6. Notably, the composition of such materials allows the pole pieces to be formed by an injection molding process or other similar forming techniques. As such, the pole pieces can be easily designed to take on a wide variety of shapes and configurations. Moreover, an injection molding process is typically more economical than a machining or stamping processes, particularly in applications involving relatively complex part shapes and relatively high production volumes.

As illustrated in FIG. 1, the pole pieces 16, 18, 20, 22 have a wedge or ramp shape. It should be understood, however, that other shapes and configurations are also contemplated as falling within the scope of the present invention, including more uniform shapes, such as a rectangular shape. Each of the pole pieces 16, 18, 20, 22 are similarly configured, and therefore only pole piece 16 need be described in detail, it being understood that the remaining pole pieces 18, 20, 22 have substantially the same configuration as pole piece 16.

In a preferred embodiment of the present invention, each of the pole pieces includes a tapered surface 30 oriented at an oblique angle α relative to the longitudinal axis L. In a specific embodiment, the angle α falls within a range of about 15 degrees to about 45 degrees, and in a more specific embodiment angle α is approximately 35 degrees. However, it should be understood that other oblique angles α are also contemplated as falling within the scope of the present invention. It should also be understood that although the tapered surface 30 is illustrated as being substantially planar, other non-planar configurations are also contemplated, such as, for example, curvilinear or arcuate configurations. Each of the pole pieces also preferably includes a non-tapered surface 32 arranged substantially parallel to the longitudinal axis L and being contiguous with the tapered surface 30. Each of the pole pieces also preferably includes axially extending surfaces 34, 36 offset from one another to define a shoulder 36, and a pair of opposite end surfaces 40, 42.

In the illustrated embodiment of the magnetic sensor 10, the pole pieces 16, 20 are positioned adjacent the magnet 12 and the pole pieces 18, 22 are positioned adjacent the magnet 14. More specifically, the shoulder 36 of each pole piece 16, 20 is engaged against a respective corner portion of the magnet 12, with the axial surface 34 abutting the inwardly facing surface 12b of magnet 12 and the axial surface 36 overhanging a corresponding end surface 12c, 12d of magnet 12. Similarly, the shoulder 36 of each pole piece 18, 22 is engaged against a respective corner of the magnet 14, with the axial surface 34 abutting the inwardly facing surface 14b of magnet 14 and the axial surface 36 overhanging a corresponding end surface 14c, 14d of magnet 14. One function of the shoulder 36 is to ensure proper axial positioning of pole pieces 16, 18, 20, 22 with respect to the magnets 12, 14.

Figure 4:
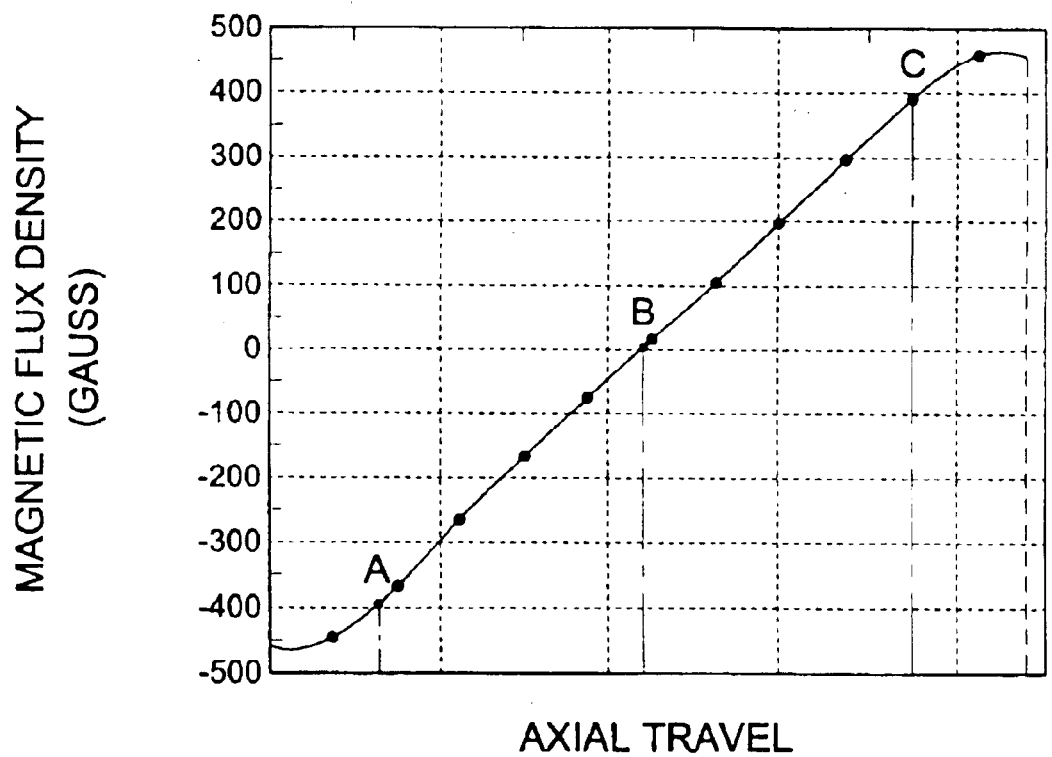
FIG. 4 is a graph depicting measured magnetic flux density along a sensing path of the magnetic position sensor illustrated in FIG. 1 as a function of axial travel along the sensing path.

As illustrated in FIG. 1, the pole pieces 16, 18 are disposed within the air gap G in an opposing manner, with the tapered/non-tapered surfaces 30, 32 of pole piece 16 arranged generally opposite the tapered/non-tapered surfaces 30, 32 of pole piece 18. Similarly, the pole pieces 20, 22 are disposed within the air gap G in an opposing manner, with the tapered/non-tapered surfaces 30, 32 of pole piece 20 arranged generally opposite the tapered/non-tapered surfaces 30, 32 of pole piece 22. Accordingly, the magnetic circuit is substantially symmetrical relative to longitudinal axis L and a transverse axis T extending across the air gap G. As illustrated in FIG. 4, the magnetic field generated by the magnetic circuit is also substantially symmetrical relative to longitudinal axis L and transverse axis T.

In a preferred embodiment of the present invention, the magnets 12, 14 and the pole pieces 16, 18, 20, 22 are enclosed by the magnetically permeable bracket 24. Preferably, the bracket 24 is formed of a metallic material, such as, for example, soft magnetic steel. However, it should be understood that other suitable magnetically conductive materials are also contemplated. In one embodiment of the invention, the bracket 24 serves to enhance/intensify the magnetic field levels generated within the air gap G by providing a return path for the magnetic flux generated by the magnets 12, 14. Additionally, the bracket 24 serves to shield the magnetic circuit from any magnetic fields existing outside of the sensor 10 to prevent or at least minimize magnetic hysteresis and/or magnetic or electrical interference.

In the illustrated embodiment of the invention, the magnetically permeable bracket 24 has a rectangular configuration. The axial surface 12a of magnet 12 is preferably adjoined to an inner surface 24a of bracket 24 and the pole pieces 16, 20 are preferably adjoined to the axial surface 12b of magnet 12. Likewise, the axial surface 14a of magnet 14 is preferably adjoined to an inner surface 24b of bracket 24 and the pole pieces 18, 22 are preferably adjoined to the axial surface 14b of magnet 14. Such adjoinment substantially prevents relative movement between the components of the magnetic circuit, which in turn eliminates or at least minimizes sensor error and/or magnetic hysteresis. For purposes of the present invention, the term "adjoined" is broadly defined as a unitary fabrication, a permanent affixation, a detachable coupling, a continuous engagement or a contiguous disposal of a first structure relative to a second structure. In one embodiment, adjoinment is accomplished through the use of a bonding agent, such as, for example, an adhesive or a plastic bond. However, other methods of adjoinment are also contemplated, such as, for example, welding, fastening or any other method that would occur to one of ordinary skill in the art.

Although the magnetically permeable bracket 24 has been illustrated and described as having a rectangular configuration, other configurations are also contemplated as would occur to one of ordinary skill in the art, such as, for example, a circular or ring configuration. Moreover, although the bracket 24 is illustrated as having a closed loop configuration, it should be understood that the bracket 24 may be divided into a pair of opposing C-shaped brackets, with each C-shaped bracket being associated with the magnet field generated by a respective magnet 12, 14. It should further be understood that the magnetically permeable bracket 24 could be eliminated from the magnetic circuit entirely.

The magnetic flux sensor 26 is positioned within the air gap G and is operable to sense varying magnitudes of magnetic flux density associated with the magnetic fields generated by the magnetic circuit. The magnetic flux sensor 26 includes a magnetic flux sensing plane S and a pair of opposite sensing surfaces 26a, 26b arranged substantially parallel to the sensing plane S. For purposes of the present invention, a "magnetic flux sensor" is broadly defined as any device that is capable of sensing magnetic flux density and generating at least one output signal that is representative of the sensed magnitude of the magnetic flux density.

In one embodiment of the present invention, the magnetic flux sensor 26 is a Hall-effect device that is capable of sensing magnetic flux density passing through the sensing plane S. In a preferred embodiment of the invention, the magnetic flux sensor 26 is arranged such that the sensing plane S is oriented substantially perpendicular to the longitudinal axis L, which in the case of magnetic sensor 10 is a linear axis. In such an orientation, the sensing plane S does not face the inwardly facing surfaces 12b, 14b of magnets 12, 14, but instead faces a direction substantially perpendicular to the inwardly facing magnet surfaces 12b, 14b. It should be understood, however, that other orientations of sensing plane S are also contemplated as falling within the scope of the present invention.

The functionality of a Hall-effect device is based on the physical principle that a voltage is generated transverse to the current flow direction in an electric conductor if a magnetic field is applied perpendicularly to the conductor. Typically, a Hall element is a small platelet that is formed of a semi-conductive material. Preferably, the circuitry of the Hall element is integrated on a silicon chip using CMOS technology. In operation, the Hall element detects the magnitude of magnetic flux density passing through the Hall plate in a direction perpendicular to the surface of the Hall plate, and generates an output signal that is representative of the sensed magnitude of magnetic flux density. Preferably, the output signal is a voltage signal. Further details regarding the characteristics and operation of magnetic flux sensors, and particularly a Hall-effect type magnetic flux sensor, are disclosed in U.S. Pat. No. 6,137,288 to Luetzow, the contents of which are incorporated herein in their entirety.

One type of Hall-effect device that is suitable for use with the present invention is a programmable Hall-effect device manufactured by Micronas under Part No. HAL-805. Another suitable non-programmable Hall-effect device is manufactured by Ashai Kasei Electronics Co., Ltd. under Part No. HZ-302C (SIP type). It should be understood, however, that other types and configurations of Hall-effect devices are also contemplated as would occur to one of ordinary skill in the art. It should also be understood that other types of magnetic flux sensors are also contemplated for use in association with the present invention, such as, for example, a magneto-resistive (MR) sensor or any other magnetic field-sensitive sensor device that would occur to one of ordinary skill in the art. Use of the MR magnetic flux sensors is particularly advantageous in sensor applications where the operating environment exceeds 160 degrees Celsius.

Figure 3:
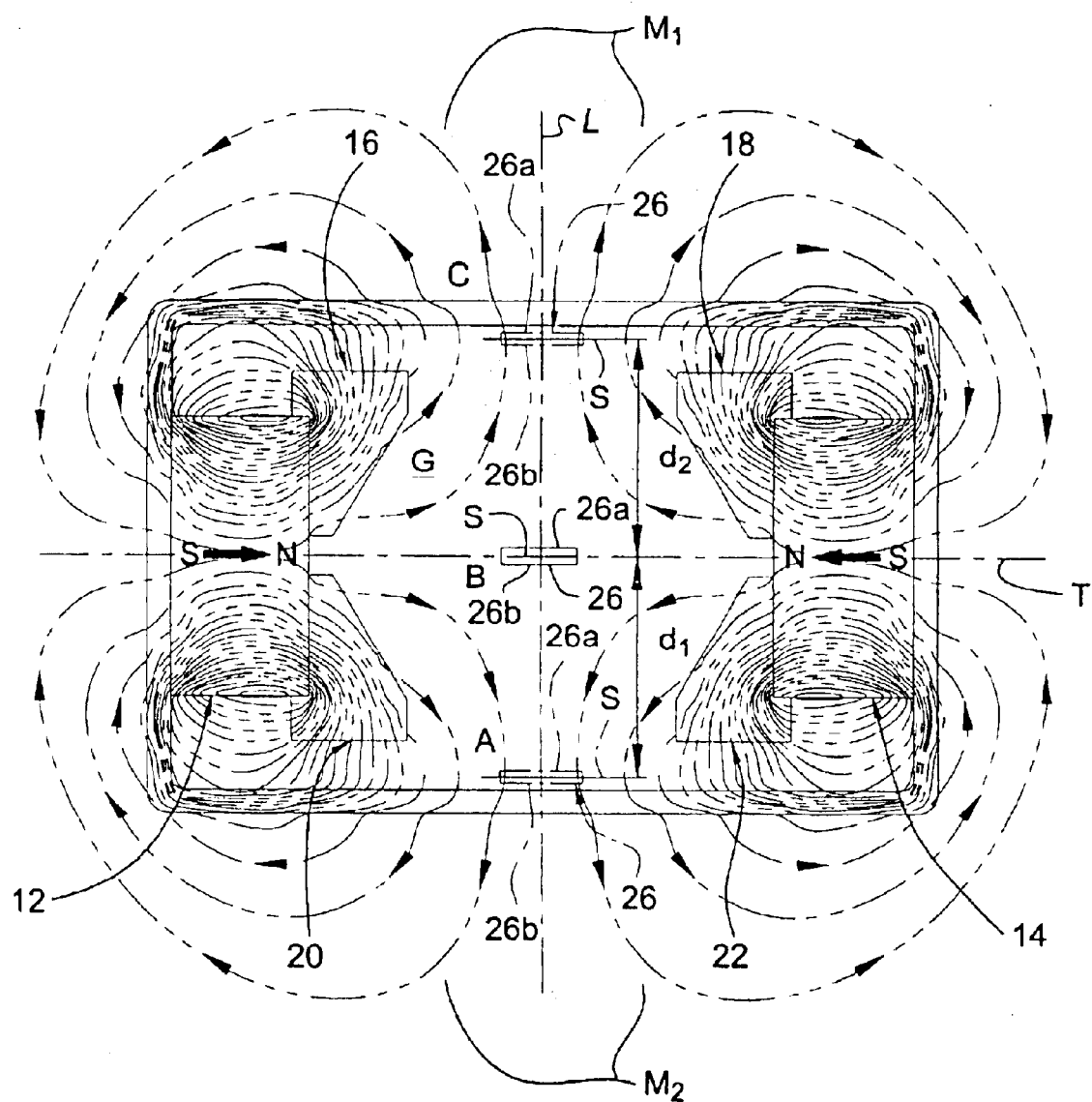
FIG. 3 is a diagrammatic view of the magnetic field associated with the magnetic position sensor illustrated in FIG. 1.

Referring to FIG. 3, the magnets 12, 14, the shaped pole pieces 16, 18 and the magnetically permeable bracket 24 cooperate to generate a magnetic field $M_1$. Likewise, the magnets 12, 14, the shaped pole pieces 20, 22 and the magnetically permeable bracket 24 cooperate to generate a magnetic field $M_2$. As discussed above, the magnetic fields $M_1$, $M_2$ are preferably substantially symmetrical relative to the longitudinal axis L. In other words, the portion of the magnetic field on one side of the longitudinal axis L is virtually a mirror image of the portion of the magnetic field on the opposite side of the longitudinal axis L. Similarly, in a preferred embodiment of the invention, the magnetic field $M_1$ is substantially symmetrical to the magnetic field $M_2$ relative to the transverse axis T.

Notably, the magnetic field $M_1$ generated by the magnets 12, 14 and the pole pieces 16, 18 has a magnetic flux density that linearly varies along the longitudinal axis L. Likewise, the magnetic field $M_2$ generated by the magnets 12, 14 and the pole pieces 20, 22 has a magnetic flux density that linearly varies along the longitudinal axis L. The magnetic flux sensor 26 is disposed inside of the air gap G and is operable to sense the magnetic flux density associated with magnetic fields $M_1$, $M_2$ generally along longitudinal axis L. In one embodiment of the invention, the magnetic fields $M_1$, $M_2$ remain in a stationary position while the magnetic flux sensor 26 is displaced generally along longitudinal axis L. In another embodiment of the invention, the magnetic flux sensor 26 remains in a stationary position while the magnetic fields $M_1$, $M_2$ are displaced generally along the longitudinal axis L. It should also be understood that in other embodiments of the invention, the magnetic flux sensor 26 and the magnetic fields $M_1$, $M_2$ could both be displaced generally along the longitudinal axis L, either at different rates and/or in opposite directions relative to one another. Mechanisms for providing such relative displacement between the magnetic flux sensor 26 and the magnetic fields $M_1$, $M_2$ are well known to those skilled in the art and therefore need not be discussed herein. Such mechanisms include, for example, various types of carriers, rotors, shafts, linkages and brackets.

As discussed above, the magnetic flux sensor 26 has a sensing plane S that is oriented substantially perpendicular to the longitudinal axis L and functions to sense varying magnitudes of magnetic flux density in directions substantially perpendicular to the sensing plane S (i.e., in directions substantially parallel to longitudinal axis L) during relative displacement between the magnetic flux sensor 26 and the magnetic fields $M_1$, $M_2$. The magnetic flux sensor 26 in turn generates an electronic signal, such as a voltage signal, that is proportional to the magnitude of the sensed magnetic flux density. As will be discussed below, the magnetic field strength or flux density sensed by the magnetic flux sensor 26 is linearly proportional to the relative position of the sensor 26 along the longitudinal axis L. As will also be discussed below, the generated voltage signal is substantially linear over a predetermined distance of travel and exhibits minimal magnetic hysteresis.

Referring to FIG. 4, shown therein is a graph depicting varying magnitudes of magnetic flux density sensed by the magnetic flux sensor 26 as a function of the relative linear displacement of sensor 26 along longitudinal axis L. Illustrated in FIGS. 3 and 4 are three operational positions of the sensor 26 along longitudinal axis L; namely positions A, B and C. Positions A and B are separated by an axial travel distance $d_1$, and positions B and C are separated by an axial travel distance $d_2$. As should therefore be apparent, the overall axial travel distance of the magnetic flux sensor 26 is $d_1$ and $d_2$.

When located at position A, the sensed magnitude of the magnetic flux density passing through the sensing plane S is at or near −400 Gauss. As illustrated in FIG. 3, when the sensor 26 is located at a position along distance $d_1$, the magnetic field lines enter the magnetic flux sensor 26 through sensing surface 26a and exit through sensing surface 26b. Notably, as the magnetic field lines pass through sensing plane S in this particular direction, the magnetic flux density is indicated as having a negative value. As the magnetic flux sensor 26 is displaced relative to the magnetic field $M_2$ toward position B, the sensed magnetic flux density proportionally decreases in magnitude. When located at position B, the sensed magnitude of the magnetic flux density passing through the sensing plane S is at or near 0 Gauss. In other words, virtually no magnetic field lines pass through the sensing plane S in directions normal to the sensing plane S when the sensor 26 is located at position B. However, as the magnetic flux sensor 26 is displaced relative to the magnetic field $M_1$ toward position C, the sensed magnetic flux density proportionally increases in magnitude. As illustrated in FIG. 3, when the sensor 26 is located at a position along distance $d_2$, the magnetic field lines enter the magnetic flux sensor 26 through sensing surface 26b and exit through sensing surface 26a. Notably, as the magnetic field lines pass through sensing plane S in this particular direction, the magnetic flux density is indicated as having a positive value. When located at position C, the sensed magnitude of the magnetic flux density passing through sensing plane S is at or near +400 Gauss. Although specific magnitudes of magnetic flux density have been disclosed herein, it should be understood that such magnitudes are for illustrative purposes only, and that other magnitudes of magnetic flux density are also contemplated as falling within the scope of the present invention.

Figure 5:
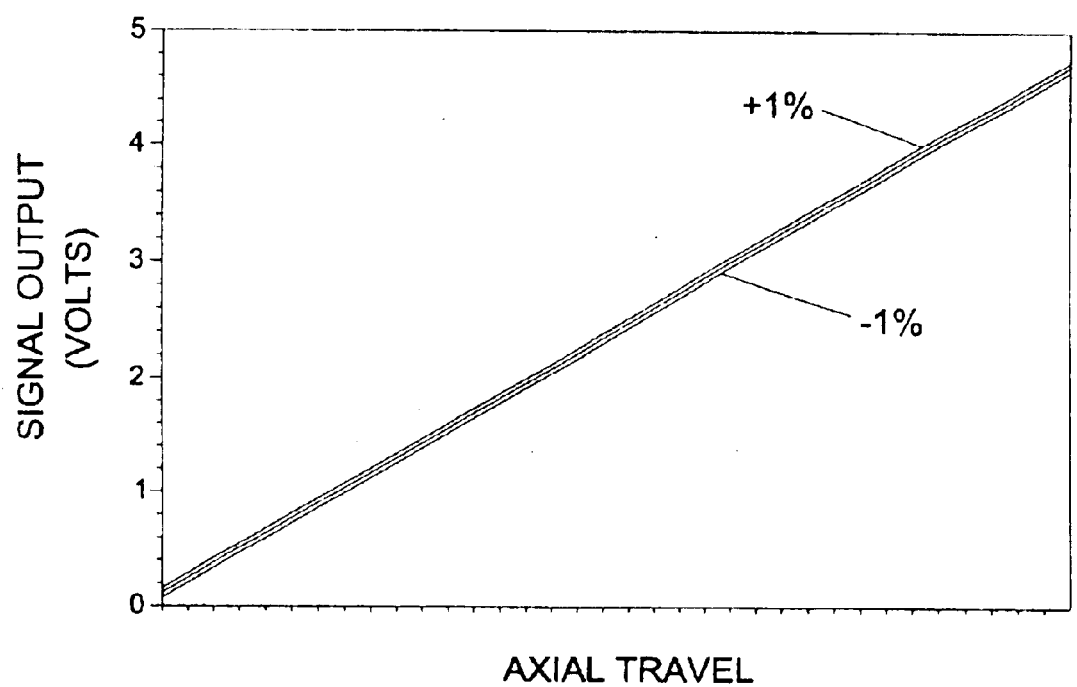
FIG. 5 is a graph depicting electronic signal output as a function of axial travel along a sensing path of the magnetic position sensor illustrated in FIG. 1.

Referring to FIG. 5, shown therein is a graph depicting change in the electronic signal output generated by the magnetic flux sensor 26 as a function of relative linear displacement of the sensor 26 along the longitudinal axis L. As shown in FIG. 5, change in the signal output of the sensor 26 linearly varies as sensor 26 is displaced relative to the magnetic fields $M_1$, $M_2$ along longitudinal axis L. As also illustrated in FIG. 5, the linear relationship between the position of sensor 26 along axis L and the representative output signal exhibits less than +/−1% deviation from a best-fit straight line. Although specific levels of voltage signal output have been disclosed herein, is should be understood that such levels are for illustrative purposes only, and that other levels and ranges of voltage signal output are also contemplated as falling within the scope of the present invention. It should be understood that other types of signal output are also contemplated, such as, for example, current signal output.

Figure 6:
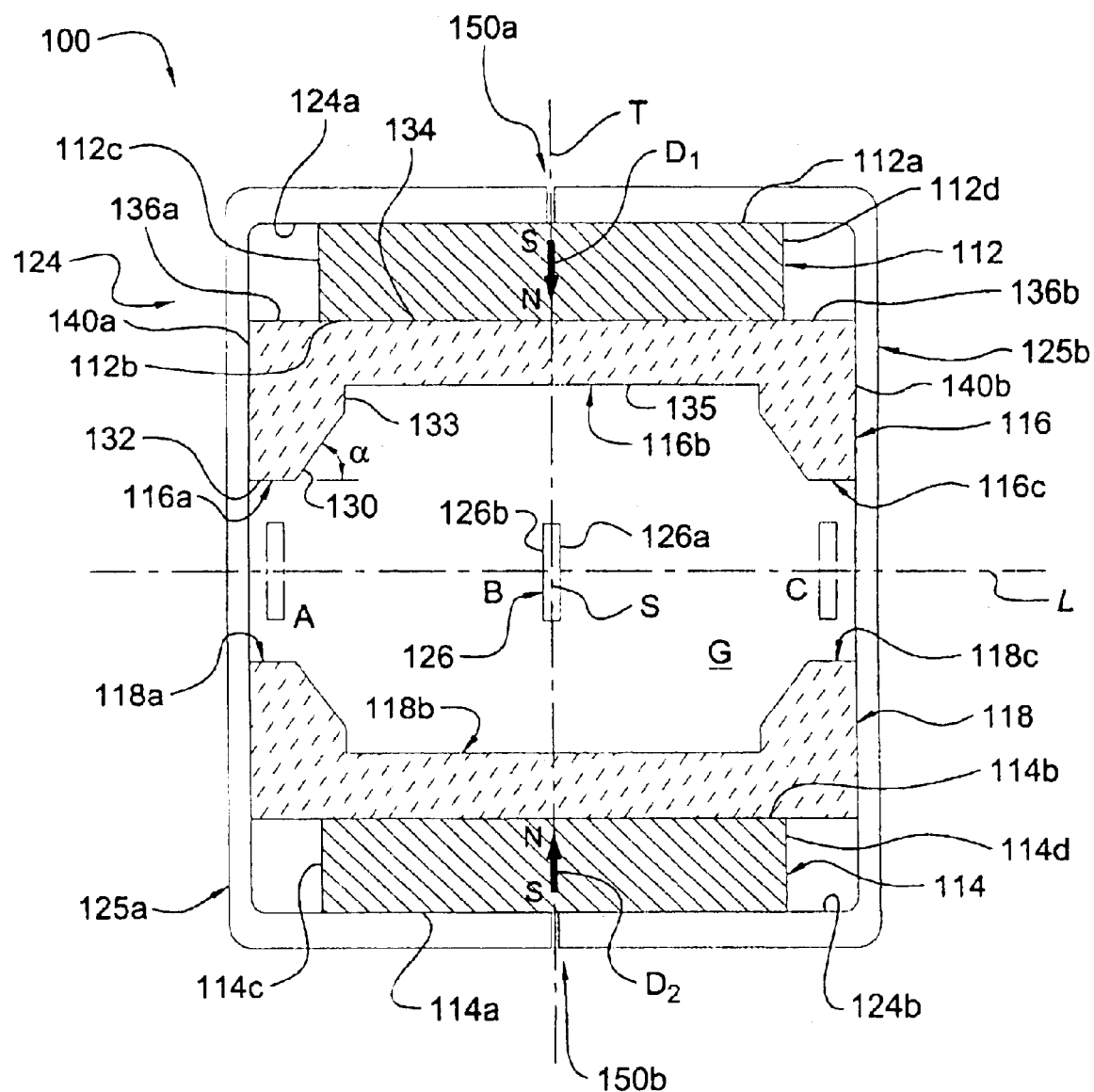
FIG. 6 is a top plan view of a magnetic position sensor according to another form of the present invention.

Referring to FIG. 6, shown therein is a magnetic position sensor 100 according to another form of the present invention. The magnetic sensor 100 includes a magnetic circuit that is generally comprised of a pair of opposing magnets 112, 114, a pair of opposing pole pieces 116, 118, and a magnetically permeable bracket or enclosure 124. The magnets 112, 114, the pole pieces 116, 118, and the bracket 124 cooperate with one another to generate one or more magnetic fields that have a magnetic flux density which varies in a substantially linear manner along an axis. The magnetic sensor 100 also includes a sensing device 126 that is operable to sense varying magnitudes of the magnetic flux density generated by the magnetic circuit and generates an output signal that is representative of the sensed magnetic flux density.

The magnets 112, 114 are spaced apart to define an air gap G extending along a longitudinal axis L. It should be understood that the air gap G is not necessarily confined to the space directly between the magnets 112, 114, but may also extend beyond the ends of the magnets 112, 114. Moreover, although the longitudinal axis L and the air gap G are illustrated as extending along a substantially linear path, it should be understood that axis L and air gap G may alternatively extend along a non-linear path, such as, for example, an arcuate or circular path.

In a preferred embodiment of the present invention, the magnets 112, 114 are rare earth magnets and have a substantially rectangular configuration. This particular type of magnet is relatively common, thereby increasing sourcing opportunities and reducing the overall cost of the magnetic sensor 100. In a specific embodiment, the rare earth magnets 112, 114 are injection molded and are substantially void of any magnetic flux density "hot spots". However, it should be understood that other magnet compositions and other methods of formation are also contemplated as would occur to one of ordinary skill in the art.

As discussed above, the magnets 112, 114 preferably have a rectangular configuration. Magnet 112 includes a pair of opposite axial surfaces 112a, 112b extending generally along longitudinal axis L and a pair of opposite end surfaces 112c, 112d. In one embodiment, the axial surface 112a is a south pole surface and the axial surface 112b is a north pole surface such that the magnet 112 is polarized in a polarization direction $D_1$. Similarly, magnet 114 includes a pair of opposite axial surfaces 114a, 114b extending generally along longitudinal axis L and a pair of opposite end surfaces 114c, 114d, with the axial surface 114a being a south pole surface and the axial surface 114b being a north pole surface such that magnet 114 is polarized in a polarization direction $D_2$. In one embodiment of the invention, the magnets 112, 114 are arranged within the magnetic circuit such that the polarization direction $D_1$ opposes the polarization direction $D_2$, with the north pole surface 112b of magnet 112 facing the north pole surface 114b of magnet 114.

Although the magnets 112, 114 have been illustrated and described as having a specific shape and polarization configuration, it should also be understood that other shapes and polarization configurations of the magnets 112, 114 are also contemplated as falling within the scope of the present invention. For example, the magnets 112, 114 may take on an arcuate shape or an irregular shape. Moreover, it is also contemplated that the magnets 112, 114 may take on other polarization configurations to provide alternative magnetic circuit set-ups. For example, the polarization directions $D_1$, $D_2$ may be reversed such that the south pole surface 112a of magnet 112 faces the south pole surface 114a of magnet 114, or that only one of the polarization directions $D_1$, $D_2$ is reversed to provide a magnetic field that flows across the air gap G.

The pole pieces 116, 118 are positioned adjacent the magnets 112, 114 and cooperate with the magnets 112, 114 to generate one or more magnetic fields having a magnetic flux density that linearly varies along the longitudinal axis L. In a preferred embodiment of present invention, the pole pieces 116, 118 are at least partially formed of a non-magnetic material. Additionally, the pole pieces 116, 118 are preferably formed of a material that has a magnetic reluctance less than the magnetic reluctance of cold rolled steel (CRS). In one embodiment of the invention, the pole pieces 116, 118 are at least partially formed of a plastic or polymer material, such as, for example, a nylon material. However, it should be understood that other suitable non-magnetic materials are also contemplated as falling within the scope of the present invention. In another embodiment of the invention, the pole pieces 116, 118 are formed of a composite material comprised of a non-magnetic material and a magnetizable filler material. In one specific embodiment, the composite material is Nylon 6/6. However, it should be understood that other suitable composite materials are also contemplated as falling within the scope of the present invention. It should also be understood that in certain embodiments of the present invention, the pole pieces 116, 118 are formed of other materials, such as, for example, steel.

In a preferred embodiment of the present invention, the pole pieces 116, 118 have a non-rectangular or irregular shape. In a specific embodiment, the pole piece 116 includes a pair of wedge or ramp-shaped portions 116a, 116c disposed adjacent opposite ends of a rectangular-shaped portion 116b. Similarly, the pole piece 118 includes a pair of wedge or ramp-shaped portions 118a, 118c disposed adjacent opposite ends of a rectangular-shaped portion 118b. In one embodiment of the invention, the pole pieces 116 and 118 are each formed as a unitary, single-piece structure. However, it should be understood that in other embodiments of the invention, the pole pieces 116 and 118 may each be formed from separate/discrete elements which are subsequently interconnected to form an integrated structure. For example, the ramp-shaped portions 116a, 116c and the rectangular-shaped portion 116b may be formed as separate elements that are subsequently interconnected to form an integrated pole piece 116.

Each of the pole pieces 116, 118 are similarly configured, and therefore only pole piece 116 will be described in detail, it being understood that the pole piece 118 has substantially the same configuration as pole piece 116. In one embodiment of the invention, each of the ramp-shaped portions 116a, 116c and 118a, 118c includes a tapered surface 130 oriented at an oblique angle α relative to the longitudinal axis L. In a specific embodiment, the angle α falls within a range of about 30 degrees to about 60 degrees. However, it should be understood that other oblique angles α are also contemplated as falling within the scope of the present invention. Each of the pole pieces also preferably includes a non-tapered surface 132 arranged substantially parallel to the longitudinal axis L and being contiguous with the tapered surface 130, and a non-tapered surface 133 arranged substantially perpendicular to the longitudinal axis L and being contiguous with the tapered surface 130 and an inwardly facing axial surface 135 of the rectangular-shaped portion 116b. It should also be understood that although the surfaces 130, 132 and 133 are illustrated as being substantially planar, non-planar configurations are also contemplated, such as, for example, curvilinear or arcuate configurations.

In a further embodiment of the invention, the pole pieces 116 and 118 are shaped, configured and positioned so as to be substantially symmetrical relative to the longitudinal axis L and the transverse axis T. More specifically, the pole pieces 116, 118 are disposed within the air gap G in an opposing manner, with the tapered/non-tapered surfaces 130, 132, 135 of pole piece 116 arranged generally opposite the tapered/non-tapered surfaces 130, 132, 135 of pole piece 118. Accordingly, the magnetic circuit is substantially symmetrical relative to the longitudinal axis L. Additionally, the ramp-shaped portions 116a and 116c of the pole piece 116 and the ramp-shaped portions 118a and 118c of the pole piece 118 are configured substantially identical to one another, with the tapered/non-tapered surfaces 130, 133 of the ramp-shaped portions 116a, 118a arranged generally opposite the tapered/non-tapered surfaces 130, 133 of the ramp-shaped portions 116b, 118b. Accordingly, the magnetic circuit is substantially symmetrical relative to the transverse axis T. As a result of the symmetrical arrangement of the pole pieces 116 and 118 relative to the longitudinal axis L and the transverse axis T, the magnetic field generated by the magnetic circuit is also substantially symmetrical relative to the longitudinal axis L and the transverse axis T. It should be understood, however, that other shapes, configurations and positions of the pole pieces 116, 118 are also contemplated as falling within the scope of the present invention, including non-symmetrical shapes, configurations and/or positions.

In a further embodiment of the invention, each of the intermediate rectangular-shaped portions 116b and 118b includes an outwardly facing surface 134 extending generally along the longitudinal axis L and an inwardly facing surface 135 arranged substantially parallel with the outwardly facing surface 134. Each of the pole pieces 116, 118 also defines opposite end surfaces 140a, 140b arranged substantially perpendicular to the longitudinal axis L. It should be understood that although the surfaces 134, 135, 140a and 140b are illustrated as being substantially planar, non-planar configurations are also contemplated, such as, for example, curvilinear or arcuate configurations.

In the illustrated embodiment of the magnetic sensor 100, the pole piece 116 is positioned adjacent the magnet 112 and the pole piece 118 is positioned adjacent the magnet 114. More specifically, the outwardly facing axial surfaces 134 of the pole pieces 116, 118 are engaged against, and preferably adjoined to, the inwardly facing axial surfaces 112b, 114b of the magnets 112, 114, respectively. In one embodiment, the opposite end portions 136a, 136b of the axial surface 134 overhangs the corresponding end surfaces 112c, 112d and 114c, 114d of the magnets 112, 114, respectively. It should be understood, however, that other positions and arrangements of the pole pieces 116, 118 relative to the magnets 112, 114 are also contemplated as falling within the scope of the present invention.

In a preferred embodiment of the present invention, the magnetic circuit associated with the sensor 100 includes a magnetically permeable bracket 124. In one embodiment, the magnetically permeable bracket 124 extends at least partially about the magnets 112, 114 and the pole pieces 116, 118. Preferably, the bracket 124 is formed of a metallic material, such as, for example, soft magnetic steel. However, it should be understood that other suitable magnetically conductive materials are also contemplated. The bracket 124 serves to enhance/intensify the magnetic field levels generated within the air gap G by providing a return path for the magnetic flux generated by the magnets 112, 114. Additionally, the bracket 124 serves to shield the magnetic circuit from any magnetic fields existing outside of the sensor 100 to prevent or at least minimize magnetic hysteresis and/or magnetic or electrical interference.

In the illustrated embodiment of the invention, the magnetically permeable bracket 124 has a rectangular configuration extending peripherally about the magnets 112, 114 and the pole pieces 116, 118. However, it should be understood that other configurations of the bracket 124 are also contemplated, such as, for example, circular or ring configurations. The bracket 124 defines an opposing pair of inwardly facing axial surfaces 124a, 124b extending generally along the longitudinal axis L. The inwardly facing axial surfaces 124a, 124b are engaged against, and preferably adjoined to, the outwardly facing axial surfaces 112a, 114a of the magnets 112, 114, respectively.

In one embodiment of the invention, the bracket 124 is peripherally interrupted by one or more openings or gaps. In the illustrated embodiment, the bracket 124 is peripherally interrupted by a pair of openings or gaps 150a, 150b that divide the bracket 124 into two separate portions 125a, 125b. In a specific embodiment of the bracket 124, the gaps 150a, 150b are arranged generally along the transverse axis T so as to divide the bracket 124 into two substantially symmetrical U-shaped portions 125a, 125b. Such an arrangement tends to reduce manufacturing and assembly costs and also serves to aid in dividing or isolating the magnetic circuit into two distinct magnetic circuit sections. However, it should be understood that other arrangements and positions of the gaps 150a, 150b are also contemplated as falling within the scope of the present invention. For example, the bracket 124 may be peripherally interrupted by one or more openings or gaps arranged generally along the longitudinal axis L. It should also be understood that in other embodiments of the invention, the bracket 124 may be formed as a continuous, uninterrupted loop. It should further be understood that the magnetically permeable bracket 124 could be eliminated from the magnetic circuit entirely.

The magnetic flux sensor 126 is positioned within the air gap G and is operable to sense varying magnitudes of magnetic flux density associated with the magnetic fields generated by the magnetic circuit. The magnetic flux sensor 126 includes a magnetic flux sensing plane S and a pair of opposite sensing surfaces 126a, 126b arranged substantially parallel to the sensing plane S. In one embodiment of the present invention, the magnetic flux sensor 126 is a Hall-effect device that is capable of sensing magnetic flux density passing through the sensing plane S. In a further embodiment of the invention, the magnetic flux sensor 126 is arranged such that the sensing plane S is oriented substantially perpendicular to the longitudinal axis L, which in the case of magnetic sensor 100 is a linear axis. In this manner, the sensing plane S of the sensor 126 is generally aligned with the directions of polarization $D_1$, $D_2$ of the magnets 112, 114. In such an arrangement, the sensing plane S does not face the inwardly facing surfaces 112b, 114b of magnets 112, 114, but instead faces a direction substantially perpendicular to the inwardly facing magnet surfaces 112b, 114b. It should be understood, however, that other orientations of sensing plane S are also contemplated as falling within the scope of the present invention. It should also be understood that other types of magnetic flux sensors are also contemplated for use in association with the present invention, such as, for example, a magneto-resistive (MR) sensor or any other magnetic field-sensitive sensor device that would occur to one of ordinary skill in the art.

The magnets 112, 114, the shaped pole pieces 116, 118 and the magnetically permeable bracket 124 cooperate to generate a magnetic field within the air gap G that is substantially similar to the magnetic fields $M_1$, $M_2$ illustrated in FIG. 3 and described above with regard to the magnetic position sensor 10. As discussed above, the magnetic field is preferably substantially symmetrical relative to the longitudinal axis L. In other words, the portion of the magnetic field on one side of the longitudinal axis L is virtually a mirror image of the portion of the magnetic field on the opposite side of the longitudinal axis L. As also discussed above, the magnetic field is preferably substantially symmetrical relative to the transverse axis T. In other words, the portion of the magnetic field on one side of the transverse axis T is virtually a mirror image of the portion of the magnetic field on the opposite side of the transverse axis T. In a preferred embodiment of the invention, the magnetic field generated by the magnets 112, 114 and the pole pieces 116, 118 has a magnetic flux density that linearly varies along the longitudinal axis L. The magnetic flux sensor 126 is disposed inside of the air gap G and is operable to sense the magnetic flux density associated with magnetic field generally along the longitudinal axis L.

In one embodiment of the invention, the magnetic field remain in a stationary position while the magnetic flux sensor 126 is displaced generally along the longitudinal axis L. In another embodiment of the invention, the magnetic flux sensor 126 remains in a stationary position while the magnetic field is displaced generally along the longitudinal axis L. It should also be understood that in other embodiments of the invention, the magnetic flux sensor 126 and the magnetic field could both be displaced generally along the longitudinal axis L, either at different rates and/or in opposite directions relative to one another.

As discussed above, the magnetic flux sensor 126 has a sensing plane S that is oriented substantially perpendicular to the longitudinal axis L and functions to sense varying magnitudes of magnetic flux density in directions substantially perpendicular to the sensing plane S (i.e., in directions substantially parallel to longitudinal axis L) during relative displacement between the magnetic flux sensor 126 and the magnetic field. The magnetic flux sensor 126 in turn generates an electronic signal, such as a voltage signal, that is proportional to the magnitude of the sensed magnetic flux density. Preferably, the magnetic field strength or flux density sensed by the magnetic flux sensor 126 is linearly proportional to the relative position of the sensor 126 along the longitudinal axis L. Additionally, the voltage signal generated by the sensor 126 is preferably substantially linear over a predetermined distance of travel and exhibits minimal magnetic hysteresis.

As should be appreciated, relative displacement between the magnetic circuit and the sensor 126 results in relative linear travel of the sensor 126 along the longitudinal axis L. Three operational positions of the sensor 126 are illustrated in FIG. 6; namely, operational positions A, B and C. As should be appreciated, the magnitude of the magnetic flux density sensed by the magnetic flux sensor 126 varies as a function of the relative linear position of sensor 126 along the longitudinal axis L. In a preferred embodiment of the invention, the magnitude of the magnetic flux density sensed by the sensor 126 varies in a substantially linear manner between the operational positions A, B and C. In a specific embodiment of the invention, the variation in the magnitude of the magnetic flux density sensed by the sensor 126 is similar to that depicted in the graph illustrated in FIG. 4. Similarly, in a specific embodiment of the invention, the change in the electronic signal output generated by the magnetic flux sensor 126 as a function of relative linear displacement of the sensor 126 along the longitudinal axis L is similar to that illustrated in FIG. 5.

Figure 7:
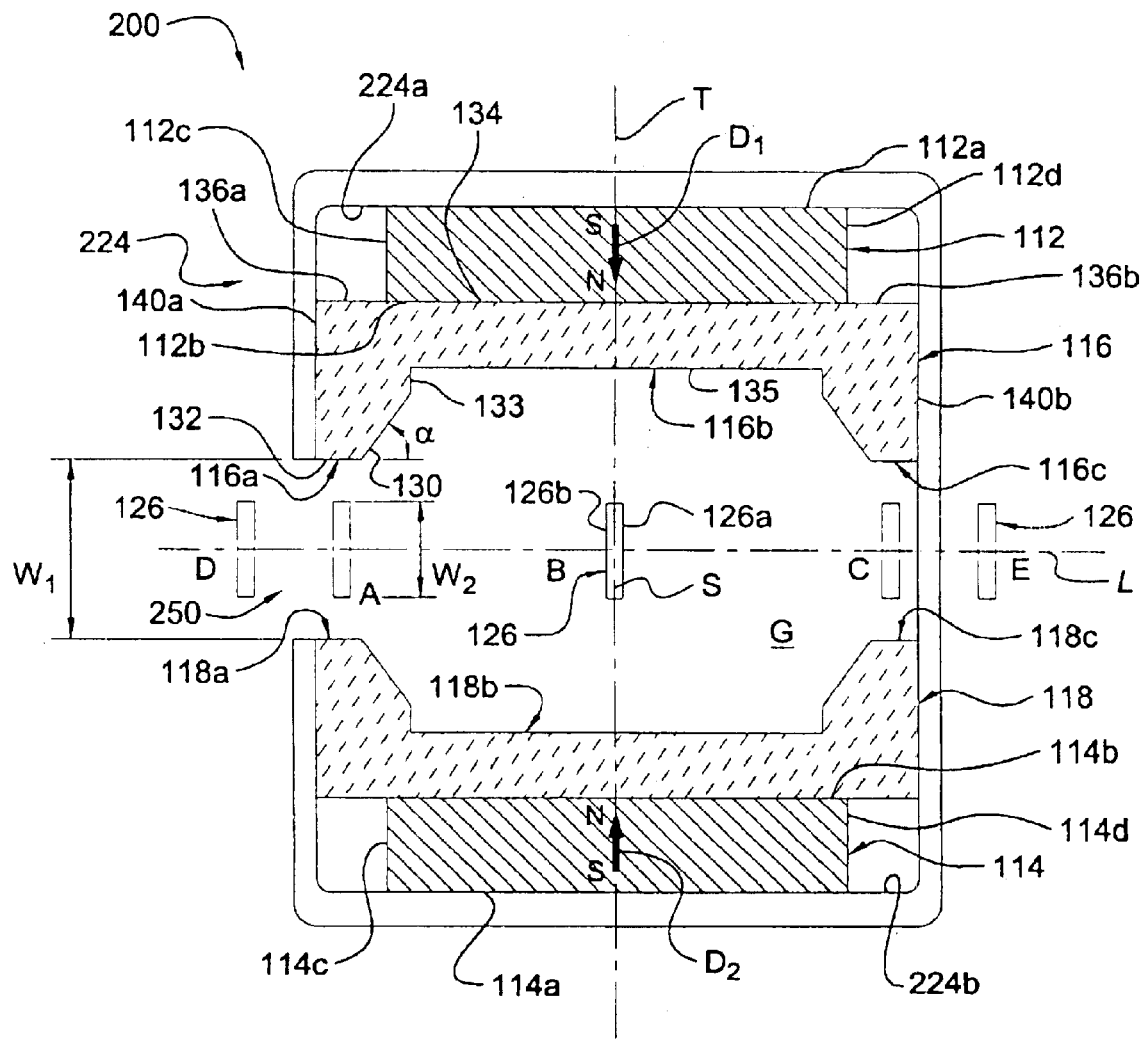
FIG. 7 is a top plan view of a magnetic position sensor according to a further form of the present invention.

Referring to FIG. 7, shown therein is a magnetic position sensor 200 according to a further form of the present invention. The magnetic sensor 200 includes a magnetic circuit that is generally comprised of a pair of opposing magnets 112, 114, a pair of opposing pole pieces 116, 118, and a magnetically permeable bracket or enclosure 224. The magnetic sensor 200 also includes a sensing device 126 that is operable to sense varying magnitudes of the magnetic flux density generated by the magnetic circuit and generates an output signal that is representative of the sensed magnetic flux density. The magnets 112, 114 and the pole pieces 116, 118 of the position sensor 200 are configured and arranged substantially similar to those illustrated and describe above with regard to the position sensor 100. However, as will be discussed below, the bracket 224 of the position sensor 200 has a configuration that is different from the bracket 124 of the position sensor 100. It should be understood that the position sensor 200 is otherwise configured substantially similar to and functions in a substantially similar manner as the position sensor 100 illustrated and described above.

The bracket 224 is preferably formed of a metallic material, such as, for example, soft magnetic steel. However, it should be understood that other suitable magnetically conductive materials are also contemplated. In one embodiment of the invention, the bracket 224 serves to enhance/intensify the magnetic field levels generated within the air gap G by providing a return path for the magnetic flux generated by the magnets 112, 114. Additionally, the bracket 224 serves to shield the magnetic circuit from any magnetic fields existing outside of the sensor 200 to prevent or at least minimize magnetic hysteresis and/or magnetic or electrical interference. In the illustrated embodiment of the invention, the magnetically permeable bracket 224 has a rectangular configuration and defines an opposing pair of inwardly facing axial surfaces 224a, 224b extending generally along the longitudinal axis L. However, it should be understood that other configurations are also contemplated, such as, for example, circular or ring configurations. The inwardly facing axial surfaces 224a, 224b of the bracket 224 are engaged against, and preferably adjoined to, the outwardly facing axial surfaces 112a, 114a of the magnets 112, 114, respectively.

In one embodiment of the invention, the bracket 224 is peripherally interrupted by one or more openings or gaps. In the illustrated embodiment, the bracket 224 is peripherally interrupted by a transverse opening 250 arranged generally along the longitudinal axis L and communicating with the air gap G. The transverse opening 250 has a width $w_1$ that is sized somewhat larger than the maximum width $w_2$ of the sensing device 126 such that the sensing device 126 is permitted to pass through the transverse opening 250 during relative displacement between the magnetic circuit and the sensing device 126. As should be appreciated, due to the inclusion of the transverse opening 250, the sensing device 126 may be displaced between operational position A inside the air gap G and an operational position D outside of the air gap G. As a result, the range of travel of the sensing device 126 relative to the magnetic circuit may be increased if so desired. It should be understood, however, that other arrangements and positions of the transverse opening 250 are also contemplated as falling within the scope of the present invention. For example, the bracket 224 may be peripherally interrupted by a pair of oppositely disposed transverse openings 250 arranged generally along the longitudinal axis L. In this manner, the sensing device 126 may be displaced between operational position C inside the air gap G and an operational position E outside of the air gap G. As a result, the range of travel of the sensing device 126 relative to the magnetic circuit may be further increased if so desired.

Although the illustrated embodiment of the magnetic sensor 10 utilizes both of the magnetic fields $M_1$, $M_2$ (FIG. 3) to generate a signal output that linearly varies with respect to the relative position of the magnetic flux sensor along the longitudinal axis L, it should be understood that in other embodiments of the invention, only one of the magnetic fields $M_1$, $M_2$ need be used to generate a linearly varying signal output. In other words, the magnetic sensor 10 could be modified to include one-half of the magnetic circuit on either side of the transverse axis T. Similarly, the magnetic sensors 100 and 200 could be modified to include one-half of the magnetic circuit on either side of the transverse axis T. Such modified embodiments would provide a smaller sized sensor package. However, as should be apparent, the length of the sensing path would correspondingly be reduced by about one-half. It should further be understood that in other embodiments of the invention, the magnetic sensors 10, 100 and 200 could be modified to include one-half of the magnetic circuit on either side of the longitudinal axis L. However, as would be appreciated by those of skill in the art, such a sensor configuration would likely be more susceptible to output error and/or signal variations caused by lateral or side-to-side movement of the magnetic flux sensor relative to the longitudinal axis L.

Additionally, although the illustrated embodiment of the magnetic sensors 10, 100 and 200 use a single magnetic flux sensor, it should be understood that a plurality of magnetic flux sensors may be positioned within the magnetic field to generate multiple signal outputs for applications requiring redundant signal outputs and/or multiple signal output profiles. Moreover, although the magnetic position sensors 10, 100 and 200 have been illustrated and described as a linear sensors (e.g., having a sensing path extending along a substantially linear axis), it should be understood that the magnetic sensors 10, 100 and 200 could also be used in other applications, such as, for example, a rotational sensor (e.g., having a sensing path extending along an arcuate or circular axis). Additionally, although the magnetic sensors 10, 100 and 200 are illustrated as being sized to accommodate a specific sensing distance along the longitudinal axis L, it should be understood that the magnetic circuits may be scaled up or scaled down to accommodate other sensing distances and/or to satisfy the particular operational requirements of the magnetic sensor.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A magnetic sensor, comprising:
    a magnetic circuit including:
        first and second magnets spaced apart to define an air gap extending along an axis; and
        first and second shaped pole pieces at least partially formed of a non-magnetic material and at least partially disposed within said air gap adjacent respective ones of said first and second magnets to produce a magnetic field having varying magnetic flux density along said axis; and
    a magnetic flux sensor disposed within said magnetic field and operable to sense said varying magnetic flux density along said axis.

2. The magnetic sensor of claim 1, wherein said non-magnetic material comprises a plastic material.

3. The magnetic sensor of claim 2, wherein said plastic material comprises a nylon material.

4. The magnetic sensor of claim 1, wherein said first and second pole pieces are formed of a composite material comprising said non-magnetic material and a magnetizable filler material.

5. The magnetic sensor of claim 4, wherein said composite material is Nylon 6/6.

6. The magnetic sensor of claim 4, wherein said composite material has a magnetic reluctance less than steel.

7. The magnetic sensor of claim 1, wherein said magnetic circuit includes a magnetically permeable bracket extending peripherally about said first and second magnets and said first and second pole pieces, said magnetically permeable bracket being peripherally interrupted in at least one location.

8. The magnetic sensor of claim 1, wherein each of said first and second magnets has a rectangular configuration.

9. The magnetic sensor of claim 1, wherein said magnetic flux sensor defines a magnetic flux sensing plane oriented substantially perpendicular to said axis.

10. The magnetic sensor of claim 1, wherein first magnet is polarized in a first direction, said second magnet being polarized in a second direction generally opposite said first direction.

11. The magnetic sensor of claim 10, wherein said magnetic flux sensor defines a magnetic flux sensing plane generally aligned with said first and second directions of polarization.

12. The magnetic sensor of claim 1, wherein each of said first and second shaped pole pieces includes a pair of ramp-shaped portions and a rectangular-shaped portion extending between said pair of ramp-shaped portions.

13. The magnetic sensor of claim 12, wherein said pair of ramp-shaped portions are symmetrical relative to a central axis passing transversely through said rectangular-shaped portion.

14. The magnetic sensor of claim 1, wherein said magnetic flux density varies in a substantially linear manner along said axis.

15. A magnetic sensor, comprising:
   a magnetic circuit including:
      first and second magnets spaced apart to define an air gap extending along an axis;
      first and second shaped pole pieces at least partially formed of a non-magnetic material and at least partially disposed within said air gap adjacent respective ones of said first and second magnets; and
      a magnetically permeable bracket extending peripherally about said first and second magnets and said first and second pole pieces and being peripherally interrupted by at least one opening;
   wherein said magnetic circuit produces a magnetic field having varying magnetic flux density along said axis; and
   a magnetic flux sensor disposed within said magnetic field and operable to sense said varying magnetic flux density along said axis.

16. The magnetic sensor of claim 15, wherein said magnetically permeable bracket is peripherally interrupted by a pair of openings to divide said magnetically permeable bracket into two portions.

17. The magnetic sensor of claim 16, wherein said pair of openings are arranged generally opposite one another to divide said magnetically permeable bracket into two substantially symmetrical portions.

18. The magnetic sensor of claim 17, wherein said substantially symmetrical portions of said magnetically permeable bracket are U-shaped.

19. The magnetic sensor of claim 15, wherein said at least one opening is positioned along said axis in communication with said air gap.

20. The magnetic sensor of claim 19, wherein said at least one opening is sized to permit said magnetic flux sensor to pass therethrough during relative displacement between said magnetic circuit and said magnetic flux sensor.

21. The magnetic sensor of claim 15, wherein said first and second pole pieces are formed of a composite material comprising said non-magnetic material and a magnetizable filler material, said composite material having a magnetic reluctance less than steel.

22. The magnetic sensor of claim 15, wherein first magnet is polarized in a first direction, said second magnet being polarized in a second direction generally opposite said first direction, said magnetic flux sensor defining a magnetic flux sensing plane generally aligned with said first and second directions of polarization.

23. A magnetic sensor, comprising:
   a magnetic circuit including:
      first and second magnets spaced apart to define an air gap extending along an axis; and
      first and second shaped pole pieces at least partially formed of a non-magnetic material and at least partially disposed within said air gap adjacent respective ones of said first and second magnets, each of said first and second shaped pole pieces including at least one ramp-shaped portion;
   wherein said magnetic circuit produces a magnetic field having varying magnetic flux density along said axis; and
   a magnetic flux sensor disposed within said magnetic field and operable to sense said varying magnetic flux density along said axis.

24. The magnetic sensor of claim 23, wherein said at least one ramp-shaped portion includes a tapered surface arranged at an oblique angle relative to said axis.

25. The magnetic sensor of claim 23, wherein said at least one ramp-shaped portion includes an axial surface arranged substantially parallel to said axis and extending contiguously from said tapered surface.

26. The magnetic sensor of claim 23, wherein each of said first and second shaped pole pieces includes a pair of said at least one ramp-shaped portion.

27. The magnetic sensor of claim 26, wherein each of said first and second shaped pole pieces includes a rectangular-shaped portion extending generally along said axis between said pair of ramp-shaped portions.

28. The magnetic sensor of claim 27, wherein said pair of ramp-shaped portions are symmetrical relative to a central axis passing transversely through said rectangular-shaped portion.

29. The magnetic sensor of claim 23, wherein said first and second pole pieces are formed of a composite material comprising said non-magnetic material and a magnetizable filler material, said composite material having a magnetic reluctance less than steel.

30. The magnetic sensor of claim 23, wherein first magnet is polarized in a first direction, said second magnet being polarized in a second direction generally opposite said first direction, said magnetic flux sensor defining a magnetic flux sensing plane generally aligned with said first and second directions of polarization.

* * * * *